Figure 1:
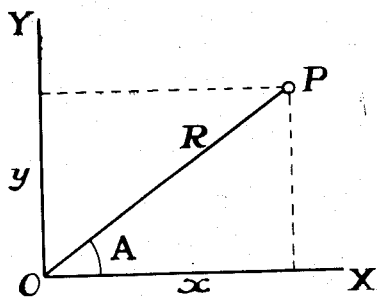

Oct. 10, 1950     L. H. BEDFORD ET AL     2,525,636
ELECTRICAL MEASURING OR CONTROL APPARATUS

Original Filed Nov. 30, 1943     2 Sheets-Sheet 1

Inventors
Leslie Herbert Bedford
John Bell
Eric Miles Langham
By Cameron, Kerkam & Sutton
Attorneys

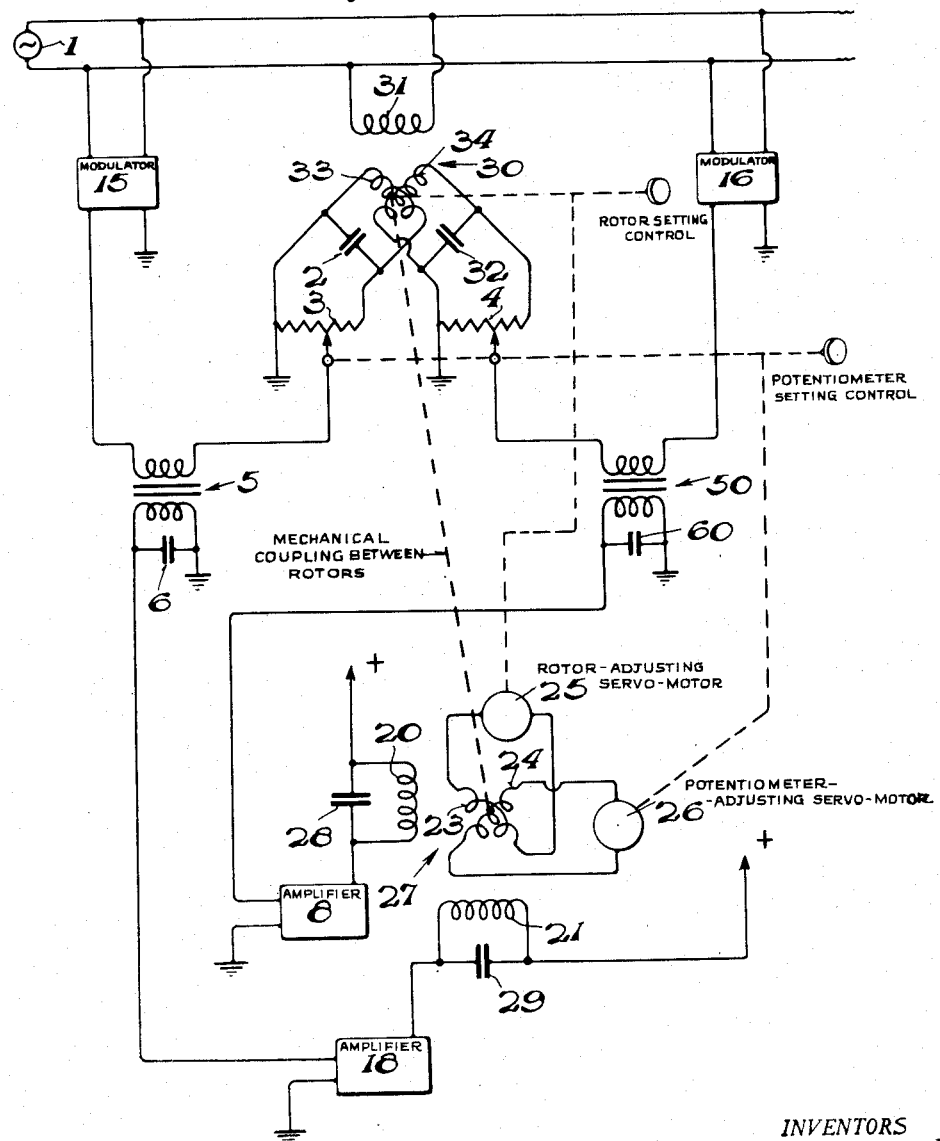

Patented Oct. 10, 1950

2,525,636

UNITED STATES PATENT OFFICE 2,525,636

ELECTRICAL MEASURING OR CONTROL APPARATUS

Leslie Herbert Bedford, London, and John Bell and Eric Miles Langham, Teddington, England, assignors to A. C. Cossor Limited, London, England, a British company Original application November 30, 1943, Serial No. 512,402. Divided and this application July 26, 1946, Serial No. 686,477. In Great Britain November 30, 1942

5 Claims. (Cl. 318—19)

This invention relates to electrical measuring or control apparatus.

It is a matter of some difficulty to adjust each of two adjustable quantities into respective equality with two given variable quantities in cases where the controls of the adjustable quantities are not independent, but where, on the contrary, both of the adjustable quantities vary in magnitude when either one of the controls is adjusted. This is especially true if the given variable quantities are varying continuously and irregularly, and if it is necessary to maintain the two equalities continuously with considerable accuracy. The purpose of the invention is to simplify this problem in the special case where both of the adjustable quantities are responsive to one control in accordance with the same law, but one of the adjustable quantities is responsive to a second control in accordance with a sine law and the other in accordance with a cosine law relative to an angle represented by the setting of said second control.

In the apparatus according to the invention, a magslip resolver is employed.

By the term "magslip resolver" is meant a device, which may alternatively be described as a low frequency iron-cored goniometer, which has two relatively rotatable iron-cored members, one having at least one primary winding and the other having at least one secondary winding, so that when the primary winding is excited at constant amplitude from a low frequency alternating source, the voltage induced in the secondary winding has an amplitude proportional to the cosine of the angle of setting of one member relative to the other.

Usually another secondary winding is provided, displaced from the first through 90° space phase, making a two-phase winding, and the secondary voltages are then in time phase with each other and have amplitudes respectively proportional to the sine and cosine of the angle of setting. When the amplitude of the primary voltage is varied, the amplitude of the secondary voltages also vary, but strict proportionality is not obtained owing to variation of the impedance with varying flux density.

The primary winding may also be duplicated to make a two-phase winding. If the second primary winding be excited with alternating voltage co-phased with that which excites the first primary winding, additional voltages are induced in the two secondary windings co-phased with those induced by the first primary winding, these being proportional to the cosine and sine respectively of the angle of setting and depending in amplitude, relative to the voltages induced by the first primary winding, on the relative amplitudes of the voltages applied to the two primary windings.

If such a second primary winding is provided, and is not required for use, it may be left on open circuit, but it is preferred that it be short-circuited.

In the arrangements according to the invention, for the purpose above described, a magslip resolver is employed which has two-phase primary windings and two-phase secondary windings, and there are provided means to excite said primary windings respectively in accordance with the degrees of unbalance of the two pairs of said adjustable and given variable quantities, means to adjust the angle of setting of said magslip resolver in accordance with the angle represented by the setting of said second control, and means to indicate each of the secondary voltages of said magslip resolver.

The term "indicate," with reference to the secondary voltages, is used in a broad sense to include either the rendering of a visible indication or the operation of a control device.

It is preferred that at least one, and more usually both, of the controls of the said adjustable quantities shall be arranged to be automatically adjusted in response to the appropriate secondary voltage of the magslip resolver, in the sense tending towards the production of the required equality.

Figure 2:
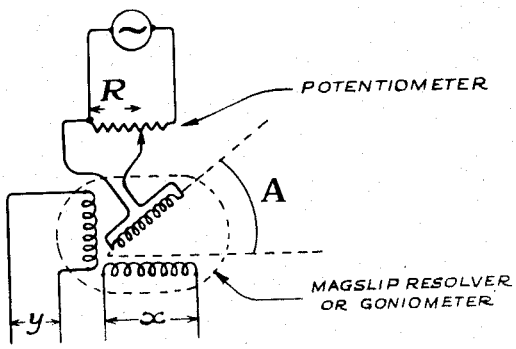

In the accompanying drawing, Figure 1 is a diagram illustrating one type of problem to which the present invention is directed, Figure 2 is a simplified circuit diagram of a device for producing two co-phased alternating voltages the amplitudes of which correspond to the Cartesian co-ordinates of the point P in Figure 1, and Figure 3 is a schematic circuit diagram of an apparatus embodying the invention. The purpose of this apparatus is to find the two-dimensional polar co-ordinates of a point, the two-dimensional Cartesian co-ordinates of which are represented by the amplitudes of two co-phased alternating voltages of low frequency. This is effected by balancing these voltages against equal and opposite voltages which are produced by means described and claimed per se in United States patent application Serial No. 512,402.

It is common mathematical and engineering practice to specify and calculate the position of a point in space or in a plane by reference to Cartesian or to polar co-ordinates. Figure 1 shows both polar co-ordinates R and A and Cartesian co-ordinates $x$ and $y$ for a point P referred to an origin O in two dimensions.

Supposing the polar co-ordinates R and A are known, then the use of a magslip resolver in which the angle of rotation of the rotor corresponds to A and a linear potentiometer in which the position of the tapping point corresponds to R, connected in a series circuit similar to that shown in Figure 2, enables the production of two in-phase alternating electrical potentials, the amplitudes of which correspond to the Cartesian co-ordinates $x$ and $y$ for the point P.

The above mentioned application Serial No. 512,402 describes a slightly more complex apparatus for obtaining these potentials corresponding to Cartesian co-ordinates of a point in three dimensions.

In certain applications of the above theory and apparatus, it is desirable that a second point P' should be made to traverse a path similar to, or identical with, the one traced by the initial point P. Such applications arise in, among other things, gun-laying, model-making, and graphical engineering calculations. In electrical computers angular rotations corresponding to R and A are required.

A minimum inaccuracy is introduced in apparatus for such applications if electrical potentials are similarly derived for the position of the second following point P', compared with the original potentials obtained for point P, and the range $r$ and bearing B controls of the second following point P' varied so as to make the voltage $x'$ for the Cartesian co-ordinates of the following point equal to the voltage $x$ of the point P, and the voltage $y'$ of the following point equal to the voltage $y$ of the point P.

It can be seen from Figure 2 that the amplitude of the voltage $x$ depends both upon the range R and upon the cosine of the angle A, whereas the amplitude of the voltage $y$ depends upon the range R and upon the sine of the angle A. With $x'$ and $y'$ similarly depending linearly upon $r$ but co-dependent, the one $x'$ according to a cosine law, and the other $y'$ according to a sine law, upon B, it is difficult manually to control the positions of B and $r$ so as to make $x'=x$ and $y'=y$.

The invention described herein provides an automatic method for obtaining the equalisation of these potentials.

Figure 3 shows a schematic circuit diagram of the apparatus in which modulators 15 and 16 are the means of providing the electrical potentials corresponding to the $x$ and $y$ co-ordinates of a point P in space, while the rotor of magslip resolver 30 follows the angular bearing B of the point P' whose path is to coincide with or be similar to the path of P. The sliding positions of the ganged potentiometers 3 and 4 correspond to the range $r$ of the same following point.

The magslip resolver 30 has primary excitation by only one primary winding 31, which is excited at constant amplitude from an alternating voltage source 1, which may conveniently be a 50 volt, 50 cycle source. Condensers 2 and 32 are connected across the cosine secondary winding 33 and the sine secondary winding 34 respectively to maintain the output voltages thereof exactly in time phase with the alternating voltage source 1. Across the respective secondary windings 33 and 34 there are also connected the two sections 3 and 4 of a two-gang linear potentiometer.

Alternating voltages to earth, co-phased with alternating source 1, and varying in amplitude in accordance with the respective Cartesian co-ordinates which are to be transformed into polars, are produced by means represented as modulating devices 15, 16 which in practical form may both be combined in a single device similar in basic construction and mode of operation to the device of Figure 2 above described, the secondary winding producing the voltage $x$ in Figure 2 being connected as the output of modulator 15 in Figure 1, and the secondary winding producing the voltage $y$ being connected as the output of modulator 16. With the potentiometer set to give a voltage proportional to R and the magslip set at an angle A, the output voltages of the secondary windings representing the output voltages of modulators 15 and 16 are R cos A and R sin A respectively. To obtain greater accuracy by using the magslip resolver under constant flux conditions, it is preferable to reverse the order of potentiometer and magslip resolver shown in Figure 1 and connect the magslip resolver primary winding directly to the voltage source 1 employing separate but ganged potentiometers, one connected to each of the secondary windings in a similar way to the voltage resolver 30 and potentiometers 3 and 4. The tappings of the potentiometers give voltages corresponding to the output voltages of modulators 15 and 16.

It is possible to derive given variable voltages corresponding to R cos A and R sin A in many different ways and detailed construction of modulating devices for obtaining these voltages forms no part of the present invention which is confined to the method of assisting the equating of two adjustable voltages to two variable voltages as set out in the following claims. Further practical embodiments of such modulating devices are described in the aforesaid application Serial No. 512,402.

The output voltages from the two sections 3 and 4 of the potentiometer both vary in proportion to the potentiometer setting, but the output voltage from section 3 varies in accordance with the cosine of the angle of setting of magslip resolver 30, while the output voltage from section 4 varies in accordance with the sine of said angle of setting. It is required to adjust the setting of ganged potentiometer 3—4 and the angle of setting of magslip resolver 30 until the output voltage of section 3 is balanced against that of modulator 15 and the output voltage of section 4 is balanced against that of modulator 16.

The two pairs of voltages to be balanced are respectively opposed in the primary windings of transformers 5 and 50, so that the secondary voltages thereof respectively represent the degrees of unbalance of the two pairs of adjustable and given variable voltages.

Condensers 6 and 60 are connected across the secondary windings of transformers 5 and 50 to bring their voltage into phase with source 1. These voltages are then applied to amplifiers 8 and 18, the output circuits of which respectively include the two-phase primary windings 20 and 21 of a magslip resolver 27. Condensers 28 and 29 connected across these primary windings have such values that the voltages developed across the two-phase secondary windings 23, 24 are both in time phase with the source 1.

The rotor of magslip resolver 27 is mechanically coupled to the rotor of magslip resolver 30, so that they are always both set to the same angle.

When the settings of magslip resolver 30 and of potentiometer 3—4 are nearly correct, the secondary voltages developed across windings 23 and 24 are proportional, one to the error in setting of magslip resolver 30 and the other to the error in setting of potentiometer 3—4.

This will be seen from the following consideration:

Let the amplitude of the output voltages of modulators 15 and 16 be (R cos A) and (R sin A) respectively, and let the amplitudes of the output voltages from potentiometer sections 3 and 4 be (r cos B) and (r sin B) respectively, r being proportional to the setting of potentiometer 3—4 and B the angle of setting of magslip resolver 30.

Then the primary voltages of magslip resolver 27 will be respectively proportional to:

(R cos A—r cos B) and (R sin A—r sin B)

This magslip resolver 27, being coupled to magslip resolver 30, will also be set to angle B. The secondary voltages will then be proportional to:

(R cos A—r cos B) cos B+(R sin A—r sin B) sin B and (R cos A—r cos B) sin B—(R sin A—r sin B) cos B These reduce respectively to:

R cos (A—B)—r and

R sin (B—A)

When B is nearly equal to A, the first of these secondary voltages is approximately proportional to (R—r) which is the error in setting of potentiometer 3—4, and is almost independent of (B—A), the error in setting of the magslip resolver 30; while the second of these secondary voltages is then approximately proportional to (B—A) and is independent of (R—r).

When B and A are not nearly equal, the proportionality is lost, but the sense of the second secondary voltage will always indicate the sense in which B should be adjusted to approach A, with the sole exception that there is an unstable equilibrium if (B—A)=π.

The sense of the first secondary voltage is not, however, reliable until B has approached near to A, because until that occurs (R cos (A—B)—r) may be negative although (R—r) is positive.

If, therefore, the errors may be large, the angle should be at least approximately corrected first. The sense of the first secondary voltage will then correctly indicate the direction in which r should be adjusted to approach B.

The output devices 25 and 26, connected across windings 23 and 24 respectively, may be centre-zero null alternating voltage indicating devices. These may be of the kind described in United States patent application Serial No. 686,478, filed July 26, 1946. When null indications are shown by both of these, this will indicate that magslip resolver 30 and potentiometer 3—4 are both correctly set to achieve the required balances. A small error in the setting of one of these will be indicated only on one of these indicating devices and a small error of the other only on the other indicating device and the senses of the indications will show the senses in which correction is required.

It is preferred, however, that output devices 25 and 26 shall be servo-motors arranged to adjust, one the magslip resolver 30 and the other the potentiometer 3—4 each in the appropriate sense to correct its setting so as to reduce the secondary voltage by which it is controlled. As is indicated in Figure 3, the servo-motors 25 and 26 are controlled by the output voltages of magslip resolver 27, and are mechanically coupled to the rotor of magslip resolver 30 and the ganged sliders of potentiometers 3 and 4, respectively, through any suitable form of gearing or other drive, the details of which are immaterial to the present invention. Inasmuch as the rotors of the two magslip resolvers are also directly coupled together mechanically, they are always set to the same angle and are simultaneously adjustable by the servo-motor 25.

This application is a division of application Serial No. 512,402, filed November 30, 1943.

We claim:

1. Apparatus for adjusting each of two adjustable quantities into respective equality or balance with two given variable quantities, comprising means for producing voltages proportional to each of the two adjustable quantities, means for producing voltages proportional to each of the two variable quantities, means for opposing the voltage proportional to each variable quantity to the voltage proportional to the adjustable quantity with which it is to be balanced, a magslip resolver having two-phase primary windings and two-phase secondary windings, means to excite said primary windings respectively in accordance with the degree of unbalance of the two pairs of adjustable and given variable quantities, two controls effecting said degree of unbalance, means for adjusting the angle of setting of said magslip resolver in accordance with the angle represented by the setting of one of said controls, and means to indicate each of the secondary voltages of said magslip resolver.

2. Apparatus according to claim 1, including means for automatically adjusting at least one of said controls in response to the appropriate secondary voltage of the magslip resolver in the sense tending towards the production of equality of said secondary voltages.

3. Apparatus according to claim 1, wherein the given variable and adjustable quantities are the amplitudes of co-phased alternating voltages, and which includes modulating devices for producing said voltages and varying the amplitudes thereof in accordance with variations in the Cartesian co-ordinates of a point which are to be transformed into polar co-ordinates.

4. Apparatus according to claim 1, including servo-motors to which the secondary voltages of said magslip resolver are applied for adjusting said controls to produce equality of said secondary voltages.

5. Apparatus for adjusting each of two adjustable quantities into respective equality with two given variable quantities, comprising a source of alternating voltage of substantially constant amplitude, a magslip resolver having a single-phase primary winding and two-phase secondary windings, means for connecting said primary winding to said source, ganged linear potentiometers connected across said secondary windings, modulators connected to said source and producing two co-phased alternating voltages each proportional in amplitude to one of the said given variable quantities, means including the primary windings of a pair of transformers for applying said voltages to adjustable tappings on said potentiometers, a second magslip resolver having two-phase primary windings and two-phase secondary windings, means for applying to said primary windings voltages from the secondary windings of said transformers, means for simultaneously adjusting both of said magslip resolvers through the same angle in accordance with one of the secondary voltages produced in the secondary windings of said second magslip resolver, and means for adjusting said ganged potentiometers in accordance with the other of said secondary voltages.

LESLIE HERBERT BEDFORD.
              JOHN BELL.
              ERIC MILES LANGHAM.

No references cited.